(12) United States Patent
Lok et al.

(10) Patent No.: US 6,846,772 B2
(45) Date of Patent: Jan. 25, 2005

(54) HYDROGENATION CATALYSTS

(75) Inventors: Cornelis Martinus Lok, Cleveland (GB); Gavin Gray, Cleveland (GB); Stephen Derek Rogers, County Durham (GB); Stephen Bailey, North Yorkshire (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 10/348,424

(22) Filed: Jan. 21, 2003

(65) Prior Publication Data

US 2003/0150774 A1 Aug. 14, 2003

Related U.S. Application Data

(63) Continuation of application No. PCT/GB01/03200, filed on Jul. 20, 2001.

(30) Foreign Application Priority Data

Jul. 21, 2000 (GB) .......................................... 0017839.2

(51) Int. Cl.⁷ .......................... B01J 21/18; B01J 27/24; B01J 21/08; C07C 51/36
(52) U.S. Cl. ...................... 502/174; 554/141; 502/200; 502/259
(58) Field of Search ................................ 502/174, 200; 554/141

(56) References Cited

U.S. PATENT DOCUMENTS

| 3,235,515 A | | 2/1966 | Taylor |
|---|---|---|---|
| 3,351,566 A | | 11/1967 | Taylor et al. |
| 4,134,905 A | * | 1/1979 | Hasman ...................... 554/144 |
| 4,532,351 A | * | 7/1985 | Barnett et al. .............. 564/415 |
| 5,258,346 A | * | 11/1993 | Huang et al. ............... 502/259 |
| 5,492,877 A | | 2/1996 | Gubitosa et al. |
| 5,498,587 A | | 3/1996 | Deckers et al. |
| 5,674,796 A | * | 10/1997 | Lee et al. ..................... 502/22 |
| 2003/0150774 A1 | * | 8/2003 | Lok et al. ..................... 208/40 |

FOREIGN PATENT DOCUMENTS

| DE | 2 150 975 | | 4/1973 |
|---|---|---|---|
| EP | 0 167 201 | | 1/1986 |
| EP | 0 168 091 | | 1/1986 |
| EP | 0 168 096 | A1 | 1/1986 |
| GB | 926235 | | 5/1963 |

OTHER PUBLICATIONS

"Physical and Chemical Aspects of Adsorbents and Catalysts," edited by J.W.E. Coenen and B.G. Linsen, Academic Press, 1970 London and New York, pp. 494–496.

M. Alderliesten, "A Nomenclature for Mean Particle Diameters," *Standardization in Particle Sizing*, May 1984, pp. 167–172.

Copy of the International Search Report, from International Application No. PCT/GB01/03200, dated Oct. 18, 2001.

* cited by examiner

*Primary Examiner*—Steven Bos
*Assistant Examiner*—William G. Wright, Sr.
(74) *Attorney, Agent, or Firm*—RatnerPrestia

(57) ABSTRACT

Production of nickel/silica hydrogenation catalyst precursors by heating a slurry of particulate silica, e.g. kieselguhr, in an aqueous nickel ammine carbonate solution for a total period of at least 200 minutes at a pH above 7.5, followed by filtration, washing, drying, and optionally calcination.

6 Claims, No Drawings

HYDROGENATION CATALYSTS

This application is a continuation of International Application No. PCT/GB01/03200, filed Jul. 20, 2001.

This invention relates to hydrogenation catalysts and in particular to nickel hydrogenation catalysts suitable for the hydrogenation of oils, fats, and fatty acids.

Nickel catalysts are widely used for the above application, which is often operated as a batch process wherein the catalyst in particulate form is dispersed in the feedstock to be hydrogenated, the mixture is then heated to the desired hydrogenation temperature and hydrogen under pressure is sparged through the heated mixture until the desired degree of hydrogenation has been achieved. The hydrogenated feedstock is then filtered from the catalyst.

In order to minimise the amount of catalyst employed, high activity catalysts have been developed, for example nickel/alumina or nickel/alumina/silica catalysts as described in EP 168091 and EP 167201 respectively. In order to have a high activity, the reduced catalysts have a high nickel surface area per gram of total nickel in the catalyst. Unfortunately it is often difficult to filter the catalysts from the hydrogenated feedstock.

We have devised an alternative method of making active catalysts which are more readily filtered.

It has been proposed in GB 926235 to make hydrogenation catalysts by heating a slurry of a support material, such as kieselguhr, in a solution of a nickel ammine carbonate complex. During the heating step, the ammine carbonate complex decomposes and a basic nickel carbonate is precipitated on to the support particles. The product is then filtered off and calcined to convert the basic nickel carbonate to nickel oxide. The active catalyst is made by reduction of the nickel oxide. That reference indicates in Example 3 that the slurry should not be heated for too long at temperatures near to the boiling point as otherwise there would be an excessive loss of carbon dioxide with the result that the basic nickel carbonate will have a low carbonate content. The Examples suggest that the total wet processing time, including the heating-up period, the period for which the slurry is maintained at the elevated temperature to effect decomposition of the ammine carbonate, and the time taken for filtration, is no more than about 3 hours.

We have found that catalysts made by this route have a relatively low nickel surface area, but that heating the slurry for extended periods at an elevated temperature increases the nickel surface area significantly and this leads in turn to a more active catalyst. During the extended heating it is believed that some of the silica dissolves. [The nickel surface area may be determined as described in "Physical and Chemical Aspects of Adsorbents and Catalysts", edited by B. G. Linsen, Academic Press, 1970 London and New York, page 494 and 495, and is a measure of the surface area of the reduced, i.e. elemental nickel in the catalyst.]

Accordingly we provide a process for the production of a hydrogenation catalyst precursor comprising heating a slurry of particles of silica suspended in an aqueous solution of a nickel ammine carbonate for a total period of at least 200 minutes at a pH above 7.5 at an elevated temperature sufficient to effect decomposition of the nickel ammine carbonate and precipitation of a basic nickel carbonate, and thereafter filtering the precipitated basic nickel carbonate from the aqueous medium.

The catalyst precursors of the invention preferably have a nickel to silicon atomic ratio in the range 0.5 to 5, particularly 1 to 3. The particulate silica is especially kieselguhr. The particulate silica typically comprises particles of surface weighted mean diameter D[3,2] in the range 1 to 30 $\mu$m, more preferably in the range 2 to 15 $\mu$m, especially below 10 $\mu$m, and a BET surface area in the range 1 to 20 $m^2/g$. Catalysts of very small particle size, e.g. D[3,2] in the range 3 to 5 $\mu$m may be particularly preferred for use in certain processes.

The catalyst precursors are made by slurrying the particulate silica with the appropriate amount of an aqueous solution of a nickel ammine complex, e.g. the product of dissolving basic nickel carbonate in a solution of ammonium carbonate in aqueous ammonium hydroxide, to give a product of the desired nickel content. The nickel ammine carbonate solution may be made by dissolving basic nickel carbonate in an aqueous solution of ammonium carbonate containing additional ammonium hydroxide. The relative amounts should be such that the pH of the solution is in the range 7.5 to 12, preferably 9 to 10.5. The solution preferably contains 0.1 to 2.5 moles of the nickel complex per litre. As the concentration of nickel increases, then generally the proportion of carbonate ions relative to hydroxide ions in the basic nickel carbonate feed should be increased. The slurry is then heated, e.g. to a temperature in the range 60 to 100° C., to cause the nickel amine complex to decompose with the evolution of ammonia and carbon dioxide and to deposit a basic nickel carbonate on the surface, and in the pores, of the silica. The slurry is then maintained at the elevated temperature for a period, hereinafter the ageing period, preferably exceeding 100 minutes, particularly at least 200 minutes. During the ageing period, the pH of the solution decreases, typically to about 8.

During the ageing step at least part of the silica dissolves and reacts with the nickel complex to form a high surface area "nickel silicate". Although nickel silicates of various compositions may be formed, it is believed that generally about one nickel atom reacts to form "nickel silicate" for each molecule of silica dissolved. The solid material comprising basic nickel carbonate, "nickel silicate" and any unreacted silica is then filtered from the aqueous medium, washed and dried. The solid material may then be calcined in air, e.g. at a temperature in the range 250 to 450° C., to decompose the basic nickel carbonate to nickel oxide.

The resulting catalyst precursor may itself be useful as an oxidic catalyst for certain applications, i.e. without a further reduction step. However for use as a hydrogenation catalyst the catalyst precursor is then reduced, e.g. with hydrogen, at a temperature below about 500° C. By "catalyst precursor", we mean the solid material obtained from the aqueous reaction medium, and optionally calcined. Upon reduction, most, if not all, of the nickel oxide is reduced to metallic nickel but little or none of the "nickel silicate" is reduced; the result is nickel metal in a highly dispersed form, i.e. having a high nickel surface area. Alternatively the basic nickel carbonate may be directly reduced, i.e. without the need for a calcination step. The reduction, whether or not a preliminary calcination step is employed, may be effected by heating the precursor in the presence of hydrogen to a temperature preferably in the range 250 to 450° C., particularly in the range 300 to 430° C. Reduction temperatures below 380° C. are preferred, particularly if the ageing time is relatively short, e.g. a total heating time below about 300 min.

As indicated above, during the ageing period, it is believed that some of the silica dissolves to give silicate ions which react with the nickel to give a high surface area nickel silicate. Preferably the amounts of silica and nickel ammine carbonate employed are such that the nickel to silicon atomic ratio is in the range 0.5 to 5. It has been found that as the ageing period increases, the nickel surface area obtainable upon reduction of the precursor increases. Thus whereas products made with a short ageing period, e.g. up to 25 minutes, give reduced catalysts having a nickel surface area below about 60 m²/g total nickel, longer ageing periods, especially ageing periods of at least 100 minutes give reduced catalysts having a nickel surface area above about 70 m²/g total nickel, and in some cases above 100 m²/g total nickel, despite a proportion of the nickel being present in the reduced catalysts as "nickel silicate".

Generally only part of the silica dissolves and reacts to give "nickel silicate". Preferably the ageing time is sufficient that 5 to 40% by weight of the nickel is converted to "nickel silicate". Consequently where the nickel to silicon atomic ratio is low, the ageing time should be kept relatively short to avoid an undue amount of nickel reacting to form "nickel silicate" so that a significant proportion of the nickel remains present in a reducible form. As indicated above, by increasing the ageing period, the nickel surface area of the reduced catalyst increases. At the same time the average pore diameter of the reduced catalyst decreases: thus while catalysts made with a short ageing period have an average pore diameter above about 15 nm, catalysts made with longer ageing periods may have average pore diameters below 10 nm, or even below 5 nm. [By the term average pore diameter we mean 4 times the pore volume as measured from the desorption branch of the nitrogen physisorption isotherm at 0.98 relative pressure divided by the BET surface area].

As is well known, the average pore diameter affects the suitability of the catalyst for certain applications. Thus whereas catalysts having a relatively large average pore diameter (above about 10 nm) are required for hydrogenating vegetable oils, hydrogenation of fish oils requires catalysts with a larger nickel surface area which often result in the production of a smaller average pore diameter, e.g. 6 to 10 nm, and hydrogenation of fatty acids requires catalysts having even smaller average pore diameters, e.g. 4 to 6 nm.

Hence simply by varying the ageing time, it is possible to make catalysts suitable for different applications.

As is known in the art, the catalyst may be formed into pellets by encapsulation with a suitable hydrogenated fat or oil.

The invention is exemplified by the following examples in which all parts and percentages are expressed by weight. In the examples an aqueous stock solution of pH 10.2 of a nickel ammine carbonate complex was prepared by dissolving, per litre of stock solution, 52.1 g of basic nickel carbonate (48% Ni, 20% $CO_3$), 37.4 g of ammonium carbonate (32.5% $NH_3$, 55% $CO_3$) and 133 g of an ammonium hydroxide solution (30% $NH_3$), in water.

EXAMPLE 1

1 part of kieselguhr having an average particle size D[3,2] of 9.3 μm and a BET surface area of 5 m²/g were slurried with 40 parts of the aqueous nickel ammine carbonate complex solution. While continuously stirring, the slurry was heated to boiling over a period of 20 min and then gentle boiling was maintained while the temperature was gradually increased to about 100° C. Precipitation of the basic nickel carbonate was complete after a total heating period of 90 min. Thereafter the slurry was maintained at about 100° C. and samples taken at various times ("ageing time") after completion of precipitation. For each sample the kieselguhr carrying the precipitated basic nickel carbonate was filtered from the aqueous medium without cooling the slurry, washed with water and dried in air at 120° C. overnight.

The precipitate samples, termed "green cake", had a nickel to silicon atomic ratio of about 1. The green cake was then reduced by passing hydrogen through the catalyst precursor for 1 hour at 430° C. The properties of the samples are shown in the following table. In the table the "total heating time" is the precipitation time plus the "ageing time".

|  | 1a | 1b | 1c | 1d | 1e |
|---|---|---|---|---|---|
| Ageing time (min) | 25 | 55 | 115 | 150 | 270 |
| Total heating time (min) | 115 | 145 | 205 | 240 | 360 |
| Ni content of green cake (%) | 34.0 | 34.2 | 35.0 | 36.3 | 36.9 |
| Ni content of reduced catalyst (%) | 48.3 | 48.4 | 48.5 | 49.7 | 48.9 |
| Ni surface area (m²/g total nickel) | 52 | 63 | 101 | 107 | 123 |
| BET surface area (m²/g reduced catalyst) | — | — | — | 139 | 191 |
| Average pore diameter (nm) | — | — | — | 6.3 | 4.3 |

The nickel content of the green cake increases as the ageing time increases as a result of loss of carbon dioxide from the slurry during ageing so that the composition of the precipitated basic nickel carbonate changes. The results show that a total heating time of 145 min or less was inadequate to obtain a high nickel surface area.

EXAMPLE 2

Example 1 was repeated but the amount of kieselguhr was halved. The results are shown in the following table.

|  | 2a | 2b | 2c | 2d | 2e |
|---|---|---|---|---|---|
| Ageing time (min) | 10 | 70 | 150 | 210 | 270 |
| Total heating time (min) | 100 | 160 | 240 | 300 | 360 |
| pH after ageing time | 8.5 | 8.1 | 7.9 | 7.9 | 7.9 |
| Ni content of green cake (%) | 40.8 | 41.2 | 44.7 | 44.4 | 43.7 |
| Ni content of reduced catalyst (%) | 63.3 | 63.3 | 68.3 | 67.1 | 65.4 |
| Ni surface area (m²/g total nickel) | 23 | 50 | 53 | 66 | 87 |
| BET surface area (m²/g reduced catalyst) | 28 | 59 | 76 | 106 | 127 |
| Average pore diameter (nm) | 15.3 | 15.0 | 10.1 | 7.2 | 5.6 |

EXAMPLE 3

Samples of the green cakes 2c and 2e of Example 2 were reduced at various temperatures with the following results:

|  | 3a | 3b | 3c | 3d | 3e |
|---|---|---|---|---|---|
| "Green cake" | 2c | 2c | 2c | 2e | 2e |
| Ageing time (min) | 150 | 150 | 150 | 270 | 270 |
| Reduction temperature (° C.) | 330 | 360 | 430 | 360 | 430 |
| Ni surface area (m²/g total nickel) | 70 | 73 | 53 | 91 | 87 |
| BET surface area (m²/g reduced catalyst) | 156 | 99 | 76 | 161 | 127 |
| Average pore diameter (nm) | 6.6 | 8.6 | 10.1 | 5.2 | 5.6 |

This demonstrates that a lower reduction temperature results in a larger nickel surface area and smaller pore diameter especially for samples with a relatively short ageing time.

What is claimed:

1. A process for the production of a hydrogenation catalyst comprising the steps of heating a slurry of particles of silica suspended in an aqueous solution of a nickel ammine carbonate for a total period of at least 200 minutes at a pH above 7.5 at an elevated temperature sufficient to effect decomposition of the nickel ammine carbonate and precipitation of a basic nickel carbonate, filtering the precipitated basic nickel carbonate from the aqueous medium, and reducing said filtered basic nickel carbonate precipitate in hydrogen at a temperature below 380° C.

2. A process according to claim 1 wherein the silica is kieselguhr.

3. A process according to claim 1 wherein the slurry is maintained at said elevated temperature for at least 100 minutes after completion of the decomposition of the nickel ammine carbonate.

4. A process according to claim 1 wherein the amounts of silica and nickel ammine carbonate employed are such that the nickel to silicon atomic ratio is in the range 0.5 to 5.

5. A process according to claim 1 further comprising, prior to the reducing step, calcining the filtered basic nickel carbonate precipitate.

6. A process according to claim 1, wherein the particles of silica have a surface weighted mean diameter D[3,2] below 10 microns.

* * * * *